United States Patent

Aguirre

[15] 3,702,942

[45] Nov. 14, 1972

[54] SIGNAL SAMPLING CIRCUIT

[72] Inventor: Michael C. Aguirre, Oklahoma City, Okla.

[73] Assignee: Honeywell Information Systems Inc., Waltham, Mass.

[22] Filed: June 29, 1971

[21] Appl. No.: 158,032

[52] U.S. Cl. ................................307/235 R, 328/151

[51] Int. Cl. ................................................H03k 5/20

[58] Field of Search .......................307/235; 328/151

[56] References Cited

UNITED STATES PATENTS 3,309,618 3/1967 Harris et al. ................330/69

3,474,259 10/1969 Rodgers................307/235 X

*Primary Examiner*—John Zazworsky

*Attorney*—Fred Jacob et al.

[57] ABSTRACT

A current-mode amplifier is connected in series with a current source which turns the amplifier on or off in response to signal voltages connected to the current source. The current-mode amplifier samples signals from a source of signals only when the amplifier is turned on. Diodes, connected between a source of signal voltages and the current source, store electrical charges which aid the current source in providing fast turn on and fast turn off so that a high rate of sampling is possible.

2 Claims, 2 Drawing Figures

INVENTOR
MICHAEL C. AGUIRRE
BY Lloyd B. Guernsey
AGENT

INVENTOR
MICHAEL C. AGUIRRE
BY Floyd B. Guernsey
AGENT

SIGNAL SAMPLING CIRCUIT

BACKGROUND OF THE INVENTION

The present invention pertains to signal sampling circuits and more particularly to signal sampling circuits which provide fast turn on and fast turn off so that signal pulses having a short time duration can be sampled.

In modern data processing systems information is often stored on a magnetic storage medium to be retrieved and used at a later time. Such information is stored in coded form using one of the many modern magnetic recording codes. In this coded form binary ones and binary zeros are used to represent the data and these binary ones and binary zeros are represented by two different voltage levels. In some of the commonly used codes the time durations between transitions from the low value of voltage to the high value of voltage are not equal. Because of this unequal time duration it is not possible to sample the value of the voltage at regular intervals in order to decode the information which is stored on the disc storage machine. As a result it is often necessary to use the transitions of voltage to develop pulses which are then used to sample the voltages which represent the binary ones and the binary zeros of the data. In any storage and retrieval system, the primary object is, of course, to accurately record and retrieve the desired information. In modern day electronic data processing systems, however, it is becoming increasingly important to increase the rate at which data may be transferred between an external storage device and the processor of the system which actually performs the computations and manipulations of the data. When this rate of data transfer is increased it is necessary to increase the rate at which data is sampled. To increase the rate at which data is sampled it is necessary to decrease the duration of the data sampling time.

Prior art sampling circuits require a relatively long time duration to sample each bit of data so that the sampling rate is low and the time required to read a given quantity of information from the magnetic storage medium is relatively long. The present invention alleviates some of the disadvantages of the prior art circuit by providing a new and improved sampling circuit which samples binary information at a higher rate than in the prior art circuits.

It is, therefore, an object of this invention to provide a new and an improved signal sampling circuit.

Another object of this invention is to provide means for increasing the sampling rate of binary information.

Still another object of this invention is to provide a circuit which is adapted to sample signal pulses having a short time duration.

A further object of this invention is to provide a circuit which can accurately sample signals having a wide range of time durations.

SUMMARY OF THE INVENTION

The foregoing objects are achieved in the present invention by providing a current-mode amplifier which is connected to a source of signals to be sampled. A current source in series with the amplifier turns the amplifier on or off in response to signal voltages supplied to the current source. A plurality of diodes connected between the signal voltages and the current source cause the current source to be turned on or turned off very rapidly so that the amplifier is turned on or turned off very rapidly.

Other objects and advantages of this invention will become apparent from the following description when taken in connection with the accompanying drawings.

DESCRIPTION OF THE PREFERRED EMBODIMENT

Figure 1:
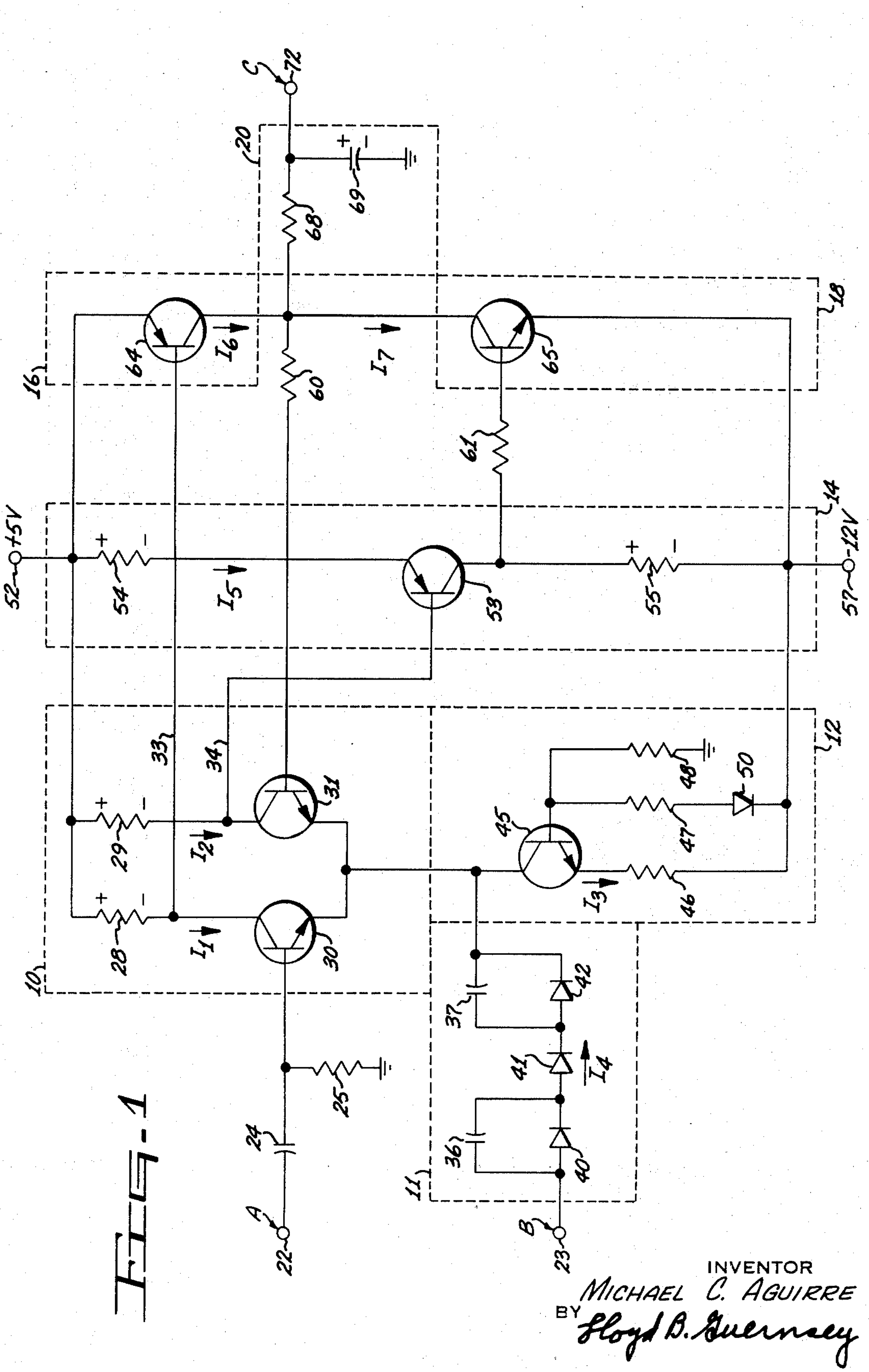
FIG. 1 is a schematic diagram of one embodiment of the present invention.

The sampling circuit shown in FIG. 1 includes a current-mode amplifier or comparator 10, a current overdrive circuit 11, a current source 12 which supplies current for the current-mode amplifier, an inverter circuit 14, a pair of power drivers 16 and 18 and a hold circuit 20. Signals which are to be sampled by the circuit are applied to the signal-input terminal 22 where they are compared to the voltage on hold circuit 20 by amplifier 10. The difference between the signal at terminal 22 and the voltage on circuit 20 causes amplifier 10 to develop control signals which are selectively coupled to power drivers 16 and 18. The operation of the amplifier 10 is controlled by switching voltages which are applied to the switching voltage terminal 23. These switching voltages determine the times at which the signals at input terminal 22 are sampled. When a high value of switching voltage is applied to terminal 23 this voltage causes the potential at the emitters of transistors 30 and 31 to be high so that the current-mode amplifier 10 is rendered inoperative and the signal at input terminal 22 is not sampled. When the switching voltage at terminal 23 has a low value the transistors 30 and 31 are rendered conductive so that any signal applied to the input terminal 22 causes amplifier 10 to provide control signals to the power drivers 16 and 18. The control signals cause a sample of the input signal to be stored on the capacitor 69 in the hold circuit 20.

Figure 2:
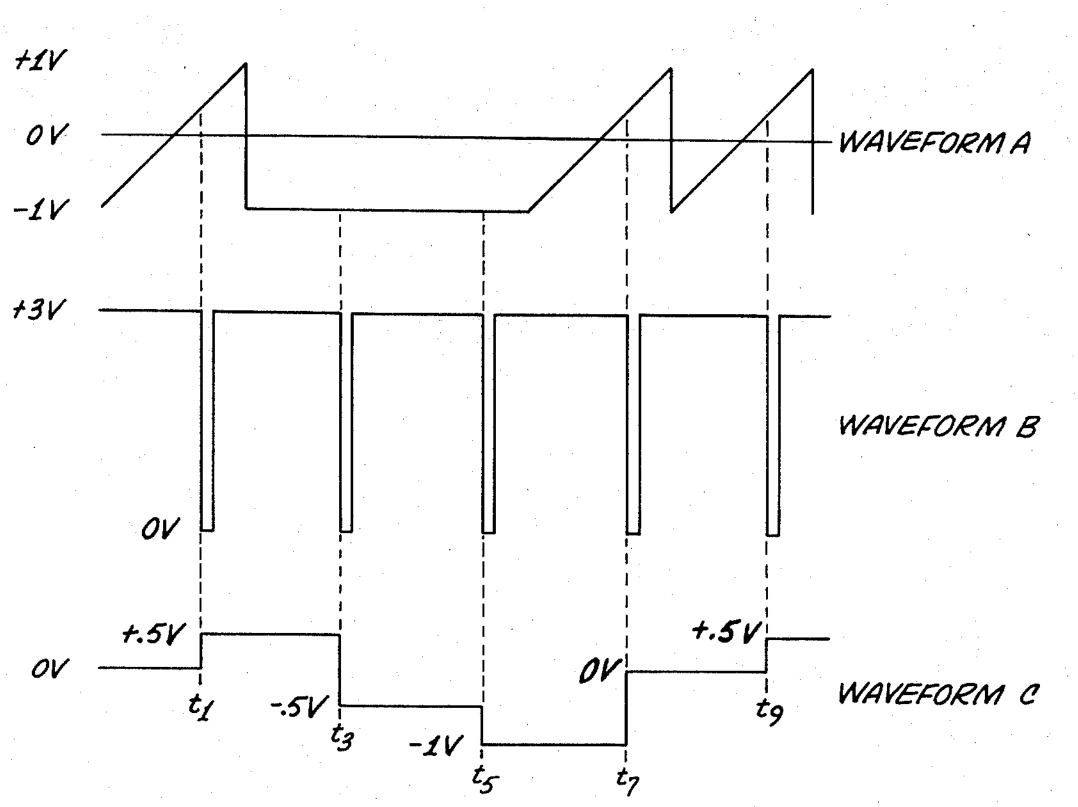
FIG. 2 illustrates waveforms which are useful in explaining the operation of the circuit shown in FIG. 1.

FIG. 2 illustrates some typical signals which may be used in the circuit shown in FIG. 1. The signal shown in waveform A may be applied to signal-input terminal 22. The voltage shown in waveform B may be applied to terminal 23 and the voltage shown in waveform C is obtained at output terminal 72.

In the current source 12 resistors 47, 48 and diode 50 provide a constant value of voltage at the base of transistor 45 so that a constant value of current $I_3$ flows through transistor 45 and through resistor 46 to terminal 57. Since the base to emitter current in transistor 45 is relatively low substantially all of the current $I_3$ through resistor 46 is the current from the collector to emitter of transistor 45. Current $I_3$ is provided either by current $I_1$ and $I_2$ flowing through transistors 30 and 31 in the current-mode amplifier 10, or by current $I_4$ flowing through the diodes connected to the switching voltage terminal 23.

When the value of voltage at the terminal 23 is high current $I_4$ flows from terminal 23 through diodes 40, 41 and 42 to the collector of the transistor 45, from the collector to the emitter of transistor 45, through resistor 46 to terminal 57. This current $I_4$ causes the voltage at the emitters of transistors 30 and 31 to be high so that transistors 30 and 31 in amplifier 10 are rendered nonconductive. When transistors 30 and 31 are nonconductive the voltages at the collectors of transistors 30 and 31 are high so that transistors 53, 64 and 65 are all rendered nonconductive and the voltage at hold circuit 20 remains substantially constant. For example, prior to time $t_1$ in FIG. 2 the voltage shown in waveform B causes the voltage at the emitters of transistors 30 and 31 to be high and causes the output voltage to be constant as shown in waveform C. At this same time the current $I_4$ causes charges to be stored in diodes 40, 41 and 42.

When the voltage at switching voltage terminal 23 decreases the voltage at the emitters of transistors 30 and 31 decreases. When the voltage at the emitters of transistors 30 and 31 decreases one of the transistors 30 and 31 is rendered conductive. If the signal at input terminal 22 is more positive than the voltage at output terminal 72 transistor 30 is rendered conductive and transistor 31 is nonconductive. If the voltage at output terminal 72 is more positive than the signal at terminal 22 transistor 31 is rendered conductive and transistor 30 is nonconductive.

When transistor 30 is rendered conductive, for example at time $t_1$, a current $I_1$ flows from the terminal 52 through resistor 28 and transistor 30 to the collector of transistor 45. Current $I_1$ divides with one portion flowing through transistor 45 and resistor 46 to terminal 57. Another portion of current $I_1$ flows through diodes 42, 41 and 40, as a reverse $I_4$ current, to terminal 23. This reverse $I_4$ current removes the electrical charges which were stored in the diodes prior to time $t_1$. The current $I_1$ provides a voltage drop of the polarity shown across resistor 28 so that the voltage at the collector of transistor 30 is relatively low. This relatively low value of voltage is coupled to the base of transistor 64 so that the conductivity of transistor 64 is relatively high. When the conductivity of transistor 64 is relatively high a current $I_6$ flows from terminal 52 through emitter to collector of transistor 64, through resistor 68 to the upper plate of capacitor 69 thereby charging capacitor 69 to the polarity shown in FIG. 1.

At time $t_1$ reverse $I_4$ current is several times as large as current $I_3$ so that the value of current $I_1$ is very large when transistor 30 is rendered conductive. This large value of current $I_1$ causes the voltage at the base of transistor 64 to decrease sharply and to cause transistor 64 to be rendered conductive or "turned on" hard so that capacitor 69 is quickly charged to a value of voltage which is determined by the value of the signal at terminal 22. Thus, diodes 40, 41 and 42 provide a large portion of the current $I_1$ at time $t_1$ and greatly increase the speed of charging capacitor 69. As a result of this increased speed of charging capacitor 69, negative going pulses having a short time duration can be applied to terminal 23 and a high sampling rate can be used in the circuit disclosed in FIG. 1.

When the voltage across capacitor 69 is equal to the voltage at terminal 22 the conductivity of transistor 30 is equal to the conductivity of transistor 31. Current $I_1$ is equal to current $I_2$ with each of these currents being small. As a result the voltage drop across resistor 28 is small and the voltage drop across resistor 29 is small so that transistors 53 and 64 are both rendered nonconductive. When transistor 53 is nonconductive transistor 65 is nonconductive. When transistors 64 and 65 are nonconductive capacitor 69 no longer charges. The voltage at output terminal 22 is equal to the value of voltage at signal-input terminal 22 at the time the signal is sampled.

When the value of voltage applied to the terminal 23 returns to the positive value as shown in FIG. 2 transistors 30 and 31 are again rendered nonconductive so that transistors 64 and 65 are nonconductive. The charge which was stored on the capacitor 69 in the hold circuit 20 remains on capacitor 69 and provides the voltage at output terminal 72 until the next sampling pulse carries this voltage to change.

If the signal voltage at terminal 22 is less positive than the voltage on capacitor 69 when the voltage at terminal 23 is low transistor 30 is nonconductive and transistor 31 is rendered conductive. When transistor 31 is rendered conductive a current $I_2$ flows from terminal 52 through resistor 29 and transistor 31 to the collector of transistor 45. Current $I_2$ divides with one portion flowing through transistor 45 and resistor 46 to terminal 57. Another portion of current $I_2$ flows through diodes 42, 41 and 40 to terminal 23. Current $I_2$ provides a voltage drop of the polarity shown across resistor 29 so that the voltage at the collector of transistor 31 is relatively low. This low value of voltage at the collector of transistor 31 is applied to the base of transistor 53 causing the conductivity of transistor 53 to be relatively high so that a current $I_5$ flows from terminal 52 through resistor 54, from emitter to collector of transistor 53, through resistor 55 to terminal 57. Current $I_5$ through resistor 55 provides a voltage drop of the polarity shown across resistor 55 thereby providing a relatively high voltage at the base of transistor 65 causing transistor 65 to be conductive.

When transistor 65 is rendered conductive a current $I_7$ flows from the upper plate of capacitor 69 through resistor 68, from collector to emitter of transistor 65 to terminal 57. Current $I_7$ provides a negative potential on the upper plate of capacitor 69 thereby providing a negative voltage at output terminal 72. When the voltage at the switching voltage terminal 23 is again high the transistors 30 and 31 are rendered nonconductive so that the voltage at output terminal 72 remains at a negative potential. Thus, the voltage at the output terminal 72 is determined by the value of the signal voltage at input terminal 22 during the time that the switching voltage applied to switching terminal 23 has a low value.

When narrow negative pulses having a short time duration are applied to terminal 23 capacitor 69 may not have time to charge to the value of the signal-input terminal 22 during one such pulse. For example, FIG. 2 shows the voltage waveforms which are obtained when the low value of voltage in waveform B has a time duration of 20 nanoseconds or $20 \times 10^{-9}$ sec. (20 n.s.). During 20 n.s. the maximum change in the output voltage at terminal 72 is 1 volt. At time $t_1$, the output voltage changes from a value of zero to a value of +0.5 volts, which is the value of the signal at terminal 22, so the output voltage is a true sample of the input signal voltage. However, at time $t_3$ the output voltage changes from +0.5 volts to −0.5 volts as shown in waveform C, while the input signal is −1 volt. At time $t_5$ the output voltage changes to the true value of the input signal. In analog to digital converters and in phase detector circuits more than one sample of a signal may be taken before a true sample is obtained. In these circuits sampling pulses having a short time duration may be used. When the circuit of FIG. 1 is used where the true value of output voltage must be obtained each time the input signal is sampled the time duration of the pulses in waveform B must be increased so capacitor 69 has enough time to charge to a true value of voltage.

When the input signals at terminal 22 have a voltage difference of 1 volt or less the true output voltage is obtained on the first sample. When the input signals have a voltage difference of more than 1 volt at successive sample times the second sample gives a true value of the input signal when the 20 n.s. sampling time is used.

Diodes 40, 41 and 42 change the level of the signal at terminal 23 so that transistors 30 or 31 will be rendered conductive during sampling time even when a negative voltage is applied to signal-input terminal 22.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A signal sampling circuit comprising:

first, second, third, fourth, fifth and sixth transistors each having a base, a collector and an emitter;

first, second, third and fourth potentials;

first, second, third, fourth, fifth and sixth resistors, said first resistor being connected between said first potential and said collector of said first transistor, said second resistor being connected between said first potential and said collector of said second transistor;

first and second signal-input terminals, said first input terminal being coupled to said base of said first transistor, said second input terminal being coupled to said collector of said third transistor, said collector of said third transistor being connected to said emitters of said first and said second transistors, said base of said third transistor being coupled to said fourth potential, said third resistor being connected between said second potential and said emitter of said third resistor;

a signal-output terminal, said fourth resistor being connected between said output terminal and said collector of said fourth transistor, said base of said second transistor being coupled to said collector of said fourth transistor, said fifth resistor being connected between said first potential and said emitter of said sixth transistor, said sixth resistor being connected between said collector of said sixth transistor and said second potential, said base of said sixth transistor being connected to said collector of said second transistor, said base of said fifth transistor being connected to said collector of said sixth transistor; and a capacitor, said capacitor being connected between said third potential and said output terminal, said base of said fourth transistor being connected to said collector of said first transistor, said emitter of said fourth transistor being connected to said first potential, said collector of said fifth transistor being connected to said collector of said fourth transistor, said emitter of said fifth transistor being connected to said second potential.

2. A signal sampling circuit as defined in claim 1 including:

diode means, said diode means being connected between said second input terminal and said collector of said third transistor.

* * * * *